US005255306A

United States Patent [19]

Melton et al.

[11] Patent Number: 5,255,306

[45] Date of Patent: Oct. 19, 1993

[54] CELLULAR INTERFACE UNIT FOR USE WITH AN ELECTRONIC HOUSE ARREST MONITORING SYSTEM

[75] Inventors: Donald A. Melton; Gregory A. Younger, both of Boulder, Colo.

[73] Assignee: BI Inc., Boulder, Colo.

[21] Appl. No.: 639,795

[22] Filed: Jan. 10, 1991

[51] Int. Cl.[5] .................. H04M 11/04; H04M 11/00; G08B 13/14; G08B 23/00

[52] U.S. Cl. ........................................ 379/38; 379/39; 379/56; 379/58; 340/568; 340/573

[58] Field of Search .................. 340/568, 573; 379/38, 379/39, 56, 58, 59

[56] References Cited

U.S. PATENT DOCUMENTS

| | | | |
|---|---|---|---|
| 4,577,182 | 3/1986 | Millsap et al. | 340/539 |
| 4,593,273 | 6/1986 | Narcisse | 340/539 |
| 4,675,656 | 6/1987 | Narcisse | 340/539 |
| 4,747,120 | 5/1988 | Foley | 379/38 |
| 4,825,457 | 4/1989 | Lebowitz | 379/40 |
| 4,843,377 | 6/1989 | Fuller et al. | 340/573 |
| 4,885,571 | 12/1989 | Pauley et al. | 340/573 |
| 4,910,493 | 3/1990 | Chambers et al. | 340/426 |
| 4,916,435 | 4/1990 | Fuller | 340/573 |
| 4,918,425 | 4/1990 | Greenberg et al. | 340/539 |
| 4,918,432 | 4/1990 | Pauley et al. | 340/573 |
| 4,924,211 | 5/1990 | Davies | 340/573 |
| 4,952,913 | 8/1990 | Pauley et al. | 340/573 |
| 4,952,928 | 8/1990 | Carroll et al. | 340/825 |
| 4,980,671 | 12/1990 | McCurdy | 340/568 |
| 4,993,059 | 2/1991 | Smith et al. | 379/39 |
| 4,999,613 | 3/1991 | Williamson et al. | 340/573 |
| 5,023,901 | 6/1991 | Sloan et al. | 379/38 |
| 5,131,019 | 7/1992 | Sheffer et al. | 379/39 |
| 5,146,207 | 9/1992 | Henry et al. | 340/573 |

OTHER PUBLICATIONS

Security, "Cellular Communications Goes Off-Road to Transmit Alarms", May 1987.
Radio Shack, 1990 Catalog, pp. 64 and 148.

*Primary Examiner*—Jin F. Ng
*Assistant Examiner*—William D. Cumming
*Attorney, Agent, or Firm*—Fitch, Even, Tabin & Flannery

[57] ABSTRACT

A cellular-based electronic house arrest monitoring (EHAM) system (10) electronically monitors parolees, or other personnel, required to remain at a house arrest location (12) or to report in at the house arrest location during certain hours. Monitoring occurs automatically under control of a host computer (50) at a central monitoring location remote from the house arrest location, regardless of whether conventional telephone service is available at the house arrest location. Tamper detect circuitry detects any attempt to tamper with the components of the system. The EHAM system includes an electronic tag (14) worn by the person being monitored that periodically transmits a unique identifying (ID) signal (16). The ID signal is transmitted at low power, and is receivable only over a limited range, e.g., 150 feet. A field monitoring device (FMD) (20) placed within the house arrest location receives the ID signal only if the tag is within range of the receiver, i.e., only if the person is at the house arrest location. The EHAM system utilizes a special cellular interface unit (CIU) (30) that couples the FMD via radio waves to a publicly accessible cellular telephone network (38). The EHAM system includes tamper detect features (84, 86) that detect if the CIU is opened or moved, and that assure that only a specified telephone number is dialed through the CIU.

8 Claims, 6 Drawing Sheets

CELLULAR INTERFACE UNIT FOR USE WITH AN ELECTRONIC HOUSE ARREST MONITORING SYSTEM

BACKGROUND OF THE INVENTION

The present invention relates to a personnel monitoring system, and more particularly to an Electronic House Arrest Monitoring (EHAM) system that monitors individuals wearing a special electronic tag for compliance with a court order (or other mandate) to remain at a specified location, even when conventional telephone service is not available at the specified location. Further, the invention relates to a unique cellular interface unit that may be used to convert an EHAM system that requires a telephone line installed at the house arrest monitoring location to an EHAM system that does not require a telephone line installed at the house arrest monitoring location.

Electronic house arrest monitoring systems are known in the art. See, for example, U.S. Pat. No. 4,918,432, assigned to the same assignee as is the present application, which patent is incorporated herein by reference. The EHAM system described in the '432 patent is known as an "active" EHAM system, in that it utilizes an electronic tag, worn by the individual being monitored, which periodically, e.g., every minute, transmits a unique identification (ID) signal that identifies its wearer. The ID signal is transmitted at low power, and hence is only receivable over a relatively short range, e.g., 150 feet. A Field Monitoring Device (FMD) is placed at the location where the monitoring of the individual occurs (the "house arrest location"), usually the residence and/or work place of the person being monitored. The FMD includes a receiver circuit adapted to receive the ID signal when the tag is within range thereof, i.e., when the person being monitored is at the house arrest location. The FMD also includes memory circuits suitable for keeping track of when the ID signal is received and when it is not, and thus when the monitored person is present at or absent from the house arrest location.

The FMD is coupled, through conventional telephone lines, to a host computer at a location remote from the house arrest location. The host computer is maintained by a governmental or other agency charged with the responsibility of carrying out the monitoring function. The host computer typically monitors several FMD's at numerous house arrest locations. From the information received from the FMD's, the host computer can periodically, or on request, generate appropriate reports indicating the presence or absence of the monitored person at specified house arrest locations over a specified period of time. From such reports, the monitoring agency can readily determine if the person is in compliance with a court order or other mandate to remain, or report in, at a particular house arrest location at specified times of the day.

Advantageously, the type of EHAM described in the '432 patent also includes the ability to detect any attempt by the person being monitored to tamper with the FMD or the tag. If a tamper event is detected, then the FMD makes contact with the host computer as soon thereafter as possible and reports such detected tamper. Further, the host computer may randomly make contact with the FMD to check on its operation. If contact cannot be made, e.g., if the FMD has been disconnected, destroyed or otherwise rendered non-functional, or if the telephone lines have been cut, then such lack of contact is noted and reported as a possible tamper event. Any reported tamper events may thus be manually checked out by the monitoring agency as needed, e.g., by having a parole officer or other individual go to the house arrest location and verify that the person being monitored is there and that the tag and FMD are functioning properly.

Numerous variations and adaptations of the basic active EHAM system are also known in the art. See, e.g., U.S. Pat. No. 4,952,928, also assigned to the assignee of the present application, and incorporated herein by reference.

In addition to active EHAM systems, "passive" EHAM systems are also known in the art, e.g., as shown in U.S. Pat. No. 4,747,120. In a passive system, there is no ID signal that is transmitted on a regular basis. Rather, the person being monitored must perform some act, e.g., as instructed over the telephone, at the house arrest location, such as inserting a specially coded wristlet into a decoder, placing a thumb or finger into an electronic fingerprint device, speaking certain words into the telephone, etc. Such acts, if properly done by the correct individual, cause a verification signal, or equivalent, to be generated, which verification signal is received at the host computer, thereby signalling the host computer that the correct individual is at the house arrest location at the time the act was performed.

Both the passive and active EHAM systems known in the art require that the person being monitored have a telephone line installed at the house arrest location, typically their residence. Unfortunately, many individuals who could be placed under house arrest do not have a telephone line installed, or if a telephone line is installed, it is a "party line" or other joint-use line that is not suitable for use full-time with an EHAM system. Hence, there is a need in the art for an EHAM system that is able to perform the desired monitoring function without the need of an installed telephone line at the house arrest monitoring location.

Cellular telephone units are known in the art, and provide a convenient alternative to a conventional telephone line. A cellular telephone unit typically includes a handset of some sort, similar to a conventional telephone, that allows its user to both talk and listen, as well as dial a desired telephone number. Cellular units include an RF transceiver that is coupled to a cellular telephone network that "covers" (i.e., is able to receive and send cellular RF signals over) an extensive geographical area (the RF "range" of the cellular network). The cellular telephone network, in turn, is coupled to a conventional telephone network managed by one or more local telephone companies. Hence, a person with a cellular telephone unit can make contact with a person having a conventional telephone line, and vice versa, even though the cellular telephone unit is not connected directly (with an installed telephone line) to the regular telephone network.

Cellular telephone units are highly portable, and are most frequently used within automobiles. Cellular units may be used anywhere within the RF "range" of the cellular network, whether used from a stationary or mobile location. Further, cellular units may be used without knowing precisely where they are located. All that is required for a cellular unit to be used is that it be able to receive and send signals from and to an established cellular telephone network.

Because a cellular telephone unit is highly portable, and may be readily moved from one location to another without affecting its operation, the use of a conventional cellular telephone unit in an EHAM system, e.g., to couple the FMD to the host computer via the established cellular telephone network, would create a serious problem. That is, if the person being monitored is supposed to remain within a prescribed distance of the FMD, e.g., 150 feet, a portable phone link, such as would be provided by a cellular unit, would allow the monitored individual to go anywhere within the cellular network range simply by picking up and carrying the FMD and cellular unit with him. Thus, what is needed is a cellular unit that can be coupled to an FMD, thereby allowing the EHAM function to be carried out without an installed (hard-wired) telephone line, but that can also detect and report any attempts to move the cellular unit.

Further, because a conventional cellular unit allows its user to freely access any desired telephone number by simply dialing the desired number, and because an effective EHAM system requires full-time accessibility to the host computer, there is a need for restricting a cellular unit used with an EHAM system to access only one telephone number—that telephone number coupled to the host computer.

Thus, it is evident that before a cellular unit could effectively be used as an interface between an FMD, or equivalent, and a host computer coupled to a conventional telephone line of an EHAM system, thereby allowing the EHAM function to be carried out at a house arrest location that does not have a hard-wired telephone line, there is a need to prevent, or at least detect and report, any movement of such cellular interface unit. Further, there is a need to restrict the telephone numbers that could be called by such cellular interface unit. Moreover, it would be desirable to detect and immediately report any unauthorized opening, or other tampering, of the cellular interface unit. The present invention advantageously addresses these and other needs.

SUMMARY OF THE INVENTION

The present invention provides a house arrest monitoring system that electronically monitors parolees, or other personnel, who are required to remain at a prescribed location (e.g., a house arrest location) or to report in at a prescribed location during certain hours. Advantageously, such monitoring occurs automatically under computer control from a central monitoring location remote from the prescribed location, regardless of whether conventional telephone service is available at the prescribed location. Further, tamper detect circuitry included in the house arrest monitoring system detects any attempt to tamper with the components of the monitoring system and reports such tamper attempts to the central monitoring location.

As with electronic house arrest monitoring (EHAM) systems of the prior art, one embodiment of the house arrest monitoring system of the present invention includes an electronic tag that is worn by the person being monitored, e.g., around the person's ankle or wrist. The tag transmits a unique identifying (ID) signal periodically, e.g., every 1–2 minutes. This ID signal is transmitted at low power, and hence is receivable only over a limited range, e.g., 150 feet. A field monitoring device (FMD) is placed within the prescribed location whereat the person is supposed to be, e.g , the person's house or apartment. A receiving circuit within the FMD receives the ID signal if the tag is within range of the receiver, i.e., if the person wearing the tag is in his or her house or apartment.

Unlike EHAM systems of the prior art, which use a conventional telephone system and conventional telephone lines to establish telecommunicative contact between the FMD and a host computer at a central location remote from the individual's house, the EHAM system of the present invention utilizes a special EHAM cellular interface unit. This EHAM cellular interface unit (CIU) couples the FMD via radio waves to a publicly accessible cellular telephone network. Once coupled to the cellular telephone network, a specified telephone number A' contact with the host computer. Advantageously, the EHAM CIU includes tamper detect features that detect if the CIU is opened or moved, and that assure that only a specified telephone number (the one used by the host computer) is dialed through the cellular network by the CIU.

It is thus a feature of the present invention to provide an EHAM system that may be used to perform the house arrest monitoring function regardless of whether there is a telephone installed at the house arrest location.

It is a further feature of the invention to provide such an EHAM system that performs the house arrest monitoring function automatically under control of a host computer at a central monitoring location remote from the telephoneless site where the person being monitored is under house arrest.

It is an additional feature of the invention to provide an EHAM system that utilizes a special EHAM cellular interface unit to couple a field monitoring device (FMD), or equivalent, used at the remote house arrest monitoring location to a host computer at a central location through a cellular telephone network.

It is another feature of the invention to provide a cellular interface unit (CIU) for use with an EHAM system that couples the EHAM system through a cellular network to a central monitoring location where a host computer is located, even when the location whereat the house arrest monitoring function is to occur does not have a telephone installed.

It is a further feature of the invention to provide such a CIU for use at a house arrest monitoring location that detects and reports any attempt to tamper with or move the CIU. It is a related feature of the invention to distinguish and not report nuisance movements of the CIU, e.g., accidental bumping of the CIU.

It is yet another feature of the invention to provide such a CIU that is configured to contact only a single telephone number through a cellular telephone network.

It is still an additional feature of the invention to provide such a CIU that may be used with the same FMD used with a conventional EHAM system, i.e., it is a feature of the invention that the FMD used with a CIU need not be any different from an FMD used with an installed telephone line. Such feature advantageously provides for simplified manufacturing, inventory, and installation specifications of the FMD, and correspondingly reduced manufacturing and installation costs of the EHAM system.

It is also a feature of the invention to provide a method for electronically monitoring individuals at a house arrest location when the house arrest location does not have telephone service installed thereat.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

In general, one embodiment of the present invention may be viewed as a cellular-based electronic house arrest monitoring (EHAM) system that includes the following main elements:

(1) Identifying means for generating a unique identifying (ID) signal that identifies a person being monitored.

(2) A field monitoring device (FMD), or equivalent, placed at a house arrest location where the person being monitored is supposed to be. Such FMD includes:

(a) receiver means for receiving the ID signal only if the person being monitored is at the house arrest location;

(b) means for establishing telecommunicative contact with a host computer at a monitoring location remote from the house arrest location;

(c) means for generating data signals that are sent to the host computer via the telecommunicative contact in order to report information concerning when the ID signal is received (and hence when the monitored person is at the house arrest location), as well as status information associated with the operation and identity of the identifying means and FMD; and (d) tamper means for sensing any interruption in the established telecommunicative contact, and reporting such interruption to the host computer via the data signals once the telecommunicative contact is again established.

(3) A cellular interface unit (CIU). Such CIU includes:

(a) cellular transceiver means for transmitting and receiving cellular telephone signals to and from a prescribed telephone number through a cellular telephone network;

(b) coupling means for coupling the data signals generated by the FMD to the cellular transceiver means; thereby allowing the data signals to be sent to the host computer through the cellular telephone network; and (c) tamper sensing means for sensing any attempt to tamper with the cellular interface unit and for momentarily interrupting the coupling means in response thereto; whereby any attempt to tamper with the cellular interface unit causes the established telecommunicative contact to be momentarily interrupted, which interruption is reported to the host computer by way of the data signals once the telecommunicative contact is again established.

Figure 1:
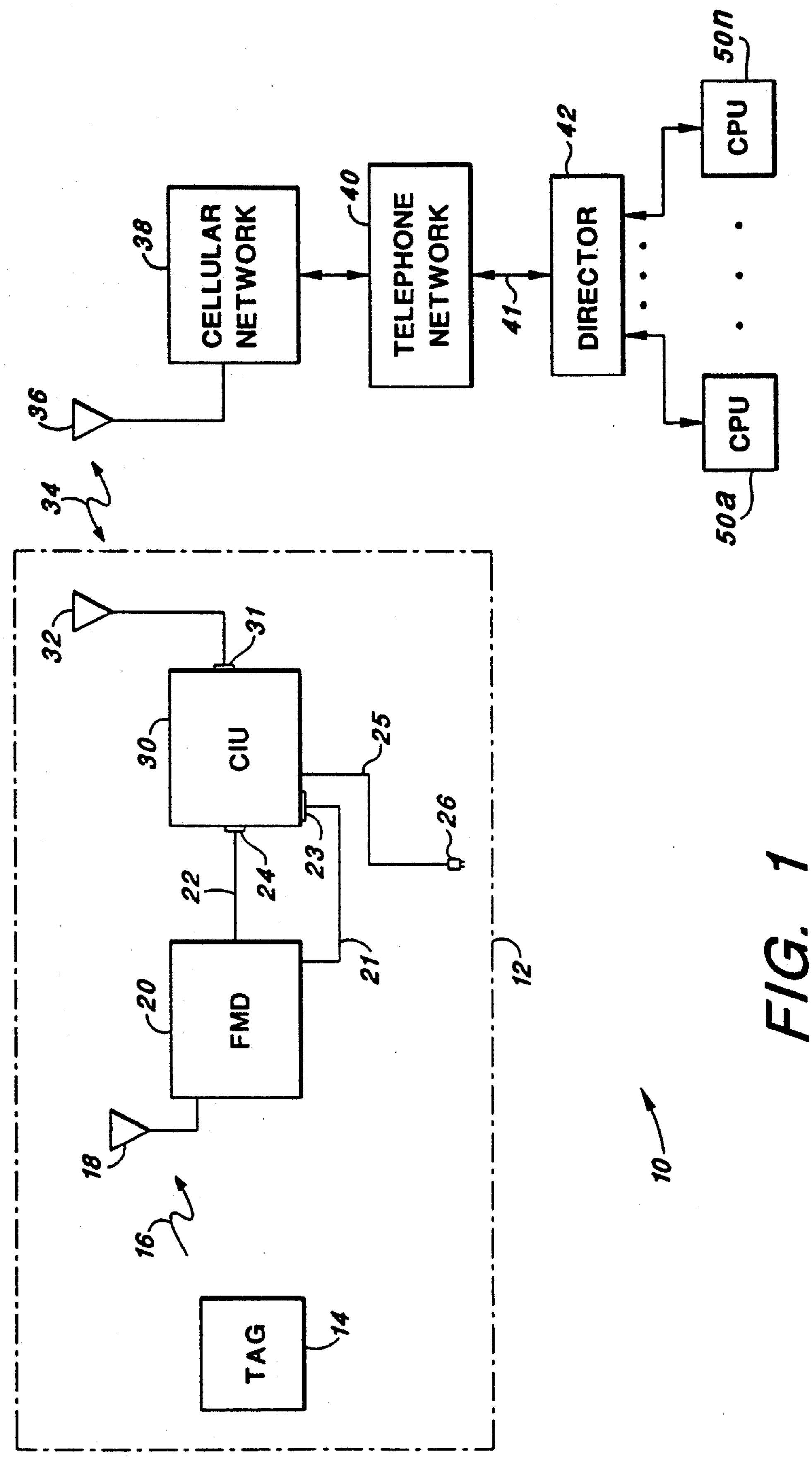
FIG. 1 is a block diagram of an electronic house arrest monitoring (EHAM) system that includes a cellular interface unit (CIU) in accordance with the present invention.

A block diagram of an EHAM system 10 made in accordance with one such embodiment of the present invention is shown in FIG. 1. As seen in FIG. 1, the EHAM system 10 includes a tag 14 that is adapted to be worn or carried by an individual being monitored in conventional manner. See, e.g., U.S. Pat. No. 4,885,571 for a more thorough description of one type of tag 14 that may be used with an EHAM system, which patent is incorporated herein by reference. The tag 14 includes means for generating an identification (ID) signal, represented schematically in FIG. 1 by the wavy arrow 16. The ID signal 16 is generated by the tag periodically, e.g., every one minute. It is transmitted at low power, so that it can be detected only over a relatively small range, e.g., 150 feet. The ID signal 16 is encoded so as to uniquely identify its wearer. Further, as described in U.S. Pat. No. 4,952,913, the ID signal 16 also includes at least one bit of information that indicates whether a tamper event has been detected. A "tamper event" may include, for example, any attempt to remove the tag from its wearer.

The individual wearing or carrying the tag 14, under a typical house arrest situation, is required to remain or report at a specified house arrest location 12. In order to electronically determine if the individual is complying with this requirement, a field monitoring device (FMD) 20 is placed at the house arrest location 12. The FMD includes an antenna 18, or equivalent, and is configured to receive the ID signal 16 if the individual wearing the tag is within range of the antenna 18, i.e., if the individual wearing the tag is within the house arrest location 12. If the tag (and hence the individual) is not at the house arrest location 12, then the ID signal 16 is not received by the antenna 18 and the corresponding receiving circuits within the FMD 20. A more thorough description of a representative FMD that may be used with the EHAM system of the present invention may be found in the previously cited U.S. Pat. No. 4,918,432.

It is noted that the FMD 20 includes a power cord 21 that is plugged into a power plug 23 on a cellular interface unit (CIU) 30, described more fully below. The CIU 30, in turn, includes a power cord 25 that may be plugged into a conventional 110 VAC outlet. The FMD 20 thus obtains 110 VAC power through the CIU power cord 25. Should a power interruption occur, a backup battery within the FMD 20, and a backup battery within the CIU 30, allows both the FMD and CIU to continue to operate. However, it is not possible to unplug the CIU without having the FMD sense such unplugging, because the FMD includes means for sensing any interruption in the line (110 VAC) power.

As described in the referenced patents, the FMD 20 keeps track of when the ID signal 16 is received. This information is then passed on to a suitable host computer, e.g., a central processing unit (CPU) 50*a*, located at a central monitoring location that may be remote from the house arrest location 12, along with other information (such as an ID code that identifies the particular FMD from which the information originates). All of this information may be referred to as the FMD data.

Typically, a given CPU 50*a* monitors several FMD's at a plurality of remote house arrest locations. Periodically or randomly telecommunicative contact is established between each FMD and the CPU in order to down load the FMD data stored therein as to when the ID signal 16 has been received. Further, should the FMD 20 detect a tamper bit in the ID signal 16, the FMD includes the capability to initiate the telecommunicative contact with the CPU 50*a* in order to alert the CPU 50*a* of the detected tamper. Moreover, the FMD also includes tamper detect features so that any attempt to tamper with the FMD itself is also detected and reported to the CPU 50*a*. Such FMD tamper events may include, for example, attempts to disconnect the phone line 22, attempts to remove power from the FMD 20, or otherwise open a case of the FMD 20.

In a conventional EHAM system, e.g., as described in the previously cited '432 patent, the FMD 20 is coupled to a conventional RJ-11 wall phone jack by means of a telephone cord 22 and a conventional RJ-11 quick disconnect plug 24. Hence, the telecommunicative contact is established using conventional telephone lines. In accordance with the present invention, however, the FMD 20 does not have to be connected to a conventional telephone line because such conventional telephone line may not be available at the house arrest location. Rather, the FMD 20 is connected to a cellular interface unit (CIU) 30, described more fully below. The connection between the FMD 20 and CIU 30 may be made by simply plugging the RJ-11 connector 24 of the FMD phone line cord 22 into a mating jack of the CIU 30. Advantageously, the circuits within the FMD 20 are oblivious to whether the FMD is connected to the CIU 30 or to a conventional telephone line. All that matters for proper operation of the FMD 20 is that it be connected to a suitable jack, such as an RJ-11 jack (commonly used for telephone connections), through which telecommunicative contact can be established. Hence, the design of the FMD may be the same regardless of whether the FMD is used with a CIU 30 or with a conventional telephone line.

As seen in FIG. 1, the CIU 30 includes an antenna 32. The antenna 32 typically plugs into a suitable connector 31 of the CIU. In operation, a transceiver circuit within the CIU 30 transmits or receives a cellular radio frequency (RF) signal, represented by the wavy arrow 34, to or from a conventional telephone cellular network 38. The cellular network 38 has a plurality of antennas, or equivalent, selectively positioned throughout the geographical area served by the cellular network. Thus, regardless of where within such geographical area a cellular RF signal 34 originates, it can be picked up and coupled to the cellular network 38. One such antenna 36 is shown in FIG. 1. In turn, the cellular network 38 is coupled to a conventional telephone network 40. Through the conventional telephone network 40, any desired telephone number, such as the number coupled to the host computer 50*a*, may be accessed. Hence, telecommunicative contact between the FMD 20 and the host CPU 50*a* may be established through the cellular network 38 even though there is no telephone line installed at the house arrest location 12.

As shown in FIG. 1, a director 42 may optionally be used to further establish desired telecommunicative contact between a plurality of FMD's, each at different house arrest locations, and a plurality of host computers, 50*a*, . . . 50*n*. A plurality of host computers may be required because the monitoring performed by the EHAM system may be carried out by a plurality of agencies, rather than a single agency, and each monitoring agency may require its own CPU. For example, one agency may monitor juvenile offenders, while another agency may monitor parolees from state prison. A third agency may monitor parolees from federal prison, and a fourth agency may monitor persons with certain medical conditions. By using a director 42 as shown in FIG. 1, all of the FMD's at the various house arrest locations may be programmed and installed to make contact with the same telephone number, i.e., the telephone number of the director 42. This greatly simplifies the manufacture and installation of the FMD's. The director (which includes a computer having substantial memory capability) keeps track of the location (telephone number) of each FMD so that it can establish contact with a desired FMD at any time. Further, the director 42 also keeps track of the location of each host computer, or CPU, so that it can establish contact with a desired CPU at any time. Thus, when a given FMD provides FMD data to the director, the director knows which host computer should receive the data, and can establish the needed connection.

A key element of the present invention is the cellular interface unit (CIU) 30. Such CIU 30 is adapted for use with an electronic house arrest monitoring (EHAM) system, whether passive or active. The EHAM system may be of conventional design and includes, for example, (1) identifying means, such as an electronic tag worn by a person being monitored that periodically transmits a unique identifying (ID) signal, or other identifying means (such as are commonly available in "passive" EHAM systems) for positively identifying the monitored person; and (2) interface means, such as a field monitoring device (FMD), or equivalent, placed at a house arrest location where the person being monitored is supposed to be for interfacing the identifying means with a host computer via an established telecommunicative link. The CIU 30 includes: (1) cellular transceiver means for transmitting and receiving cellular telephone signals to and from a prescribed telephone number through a cellular telephone network; (2) coupling means for coupling data signals generated by the FMD to the cellular transceiver means, thereby sending the data signals to the host computer through the cellular telephone network; and (3) sensing means for sensing any attempt to tamper with the CIU 30 and for momentarily interrupting the coupling means in response thereto. Thus, any attempt to tamper with the CIU causes the established telecommunicative contact to be momentarily interrupted, which interruption is reported to the host computer by means of the data signals once the telecommunicative contact is again established. Advantageously, any sustained movement of the CIU 30 (i.e., any movement other than momentary incidental movement of the CIU) is interpreted as an attempt to tamper therewith.

Figure 2:
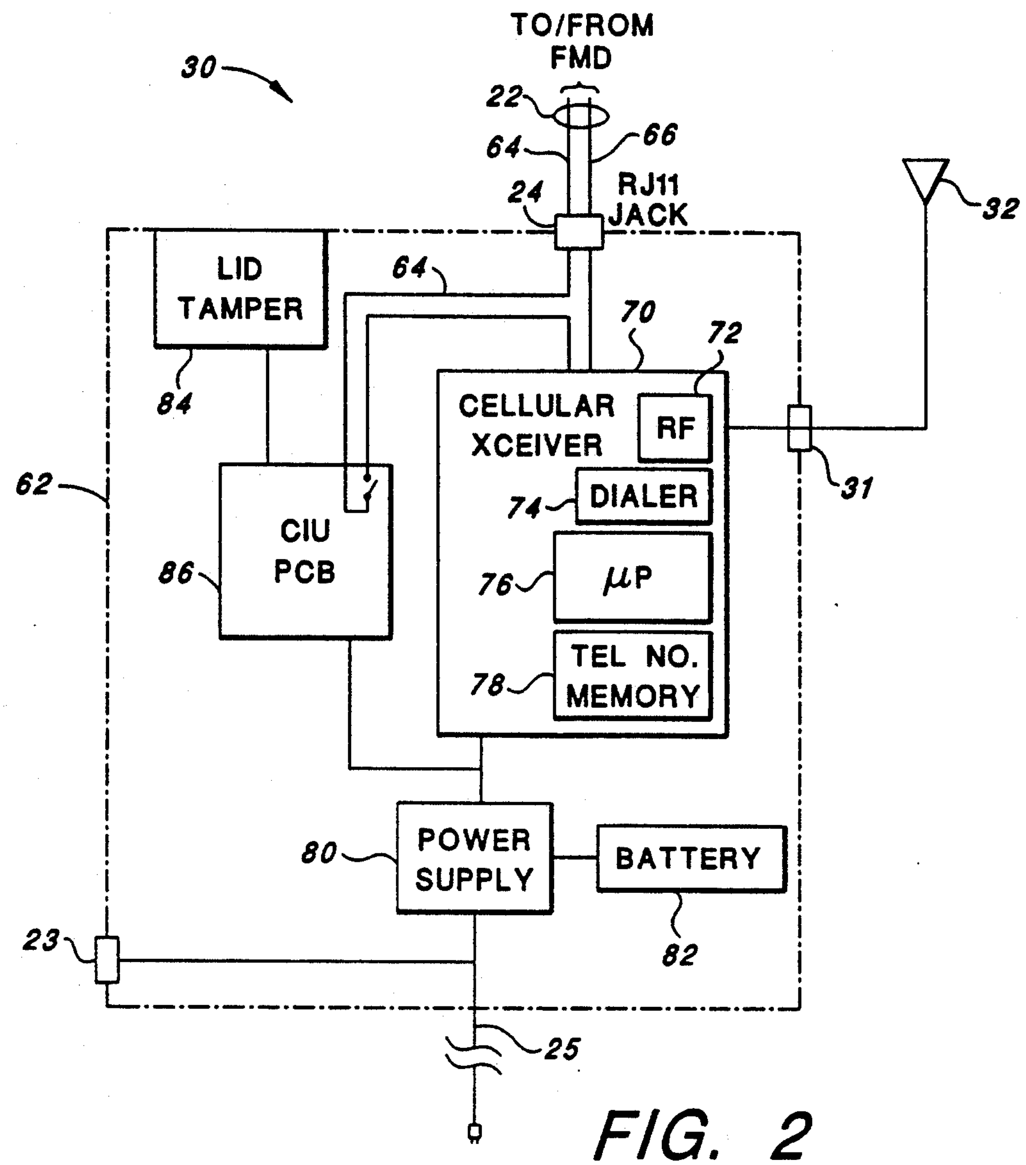
FIG. 2 is an assembly block diagram of the CIU shown in FIG. 1.

An assembly block diagram of the CIU 30 is shown in FIG. 2. The CIU 30 is housed within a closed housing 62. The closed housing 62 includes only four means for making electrical contact with the circuits inside of the housing 62. First, at least one RJ-11 jack 24 is provided into which the phone cable 22 from the FMD may be detachably connected. This phone cable includes at least two conductors 64 and 66 that carry the tip/ring voltage associated with a conventional telephone line. Second, the housing 62 includes a connector 31 into which the antenna 32 is detachably connected. Third, a power cord 25 provides a means for coupling AC power into the housing 62. Fourth, a plug 23 provides a means for transferring AC power to the FMD 20 via the power cord 21.

It is noted that some embodiments of the present invention may include a single housing sufficiently large for housing both the FMD and the CIU. In such instance, the connecting cables or wires 21 and 22 between the FMD and CIU are used internal to such a housing.

Included within the CIU housing 62 is a cellular transceiver unit 70. Cellular transceiver units are known in the art, and are available commercially from numerous sources. Except as indicated below, the cellular transceiver unit 70 used with the present invention may be of conventional design. Such units typically include an RF circuit 72 for generating and receiving the cellular RF signals that are transmitted to or received from the cellular network via the antenna 32. Further, some sort of dialer circuit 74 is included for encoding a transmitted cellular RF signal with the information needed to dial (access) a desired telephone number through the cellular network. Most cellular units include some sort of handset or keypad as part of the dialer circuit 74, similar to the handset or keypad of a conventional pushbutton telephone, for allowing a user to manually select a desired telephone number that is to be called. Also included within the cellular transceiver unit 70 is some sort of microprocessor (μP) 76, or equivalent controller, for controlling the operation of the transceiver 70. Coupled to the μP 76 is some sort of memory 78 for storing at least one telephone number that is to be called by the cellular transceiver unit 70. Additional memory stores the sequencing program of the μP 76 so that the unit 70 performs its desired function of calling or receiving signals. In accordance with the present invention, as explained more fully below, the transceiver unit 70 includes a sequencing or operating program that only allows a single telephone number to be accessed therethrough.

The transceiver 70 performs several functions, some of which generally make the RJ-11 phone jack 24 on the CIU 30 look like an RJ-11 wall jack to the FMD 20. In the normally intended application for a cellular transceiver, any valid phone number (i.e., any number having the proper number of digits) is dialed out into the cellular network 38. However, an important feature of the CIU 30 of the present invention is outgoing call restriction. In accordance with this feature, only a single telephone number may be dialed or accessed by the cellular transceiver via the cellular network. Such outgoing call restriction functions as follows: At the initial power-up of the CIU, an area of the μP's memory system is reserved to store the permitted phone number. The very first valid phone number entered into the cellular transceiver unit's RJ-11 jack 24 is stored in this memory area. This number is then dialed out into the cellular network.

Any subsequent phone numbers entered into the RJ-11 jack 24 are compared to this stored number. If there is a match, the stored number is dialed. If there is not a match, no number is dialed, and a specified tone, such as a dial tone or an error tone, is put onto the RJ-11 jack. In order to change the permitted number, the CIU must be powered off completely, i.e., all AC and battery power must be removed, and the CIU then must be powered up again from a cold start.

The manner in which outgoing call restriction is realized in accordance with a preferred embodiment of the invention is to modify the operating program of the μP 76 included in the cellular transceiver 70. Such operating program is typically provided in firmware, and can readily be modified by replacing a ROM or PROM chip located in the cellular transceiver. The modification may be accomplished as shown in the Structured English Psuedocode provided below in Table 1.

TABLE 1

STRUCTURED ENGLISH
PSUEDOCODE FOR CALL RESTRICTION

```
Define "WARM_CONST" as a constant number whose pattern
    will not be reproduced during power up;
Define "WarmStart" as a data object to retain WARM_CONST
    as long a power is applied;
Define "PermittedNumber" as a phone number data object;
Define "DialedNumber" as a phone number data object;
Define "LearnMode" as a boolean data object indicating
    when to save the first valid dialed number as the
    permitted phone number.
After RESET is negated, execute the following program:
Initialize hardware;
IF WarmStart is not equal to WARM_CONST,
    Clear memory;
    Set LearnMode TRUE;
    Assign the WARM_CONST value to WarmStart;
ENDIF;
LOOP forever,
    IF calling device goes off-hook,
        //  Learn and permission verification phase.
        REPEAT,
          Present a dial tone;
          Get DialedNumber removing dial tone after
            lst digit is dialed;
          IF DialedNumber is a valid number,
            IF LearnMode is TRUE,
              Assign Dialed Number to
                PermittedNumber;
              Set LearnMode FALSE;
            ENDIF;
          ELSE,
            Present an error tone;
          ENDIF;
        UNTIL (DialedNumber is equal to
          PermittedNumber) OR
          (the calling device goes on-hook);
        //  Normal call processing phase.
        IF the calling device is on-hook,
          Remove any dial or error tone;
        ELSE,
          Place call to PermittedNumber utilizing
            cellular network;
          Recognize call termination when calling
            device goes on-hook;
        ENDIF;
    ENDIF;
ENDLOOP;
```

Still referring to FIG. 2, it is seen that the CIU 30 includes a power supply 80 and a back-up battery 82 within the closed housing 62 Should the normal input power be interrupted, as when the power cord 25 is unplugged or power is lost for other reasons, the back-up battery 82 provides all of the operating power needed for operation of the CIU 30.

Also included within the closed housing 62 of the CIU 30, and providing key features of the present invention, are a lid tamper detect circuit 84 and a custom CIU PCB 86. The lid tamper circuit 84 detects any opening of the closed housing 62, and thus provides a means of detecting that particular type of tamper event. The CIU PCB 86 includes circuitry for switchably interrupting at least one of the telephone line conductors, e.g., conductor 64, in the event that a tamper event is detected. A tamper event is considered as either the detection of a lid tamper event by the lid tamper detector 84, or movement of the housing 62. Advantageously, as described more fully below, the CIU PCB 86 includes logic circuitry for not defining incidental movement of the CIU 30, e.g, accidental bumping, as a tamper event. Only sustained, purposeful movement of the CIU 30 is determined to be a tamper event. If a tamper event is detected, either sustained movement of the CIU or opening of its housing, the phone line conductor 64 is momentarily opened, which opening is sensed by the FMD as a tamper event that is reported to the host computer as soon as telecommunicative contact can again be established with the host computer.

In a preferred embodiment, the CIU 30 comprises a closed "box" having dimensions of approximately 17×12 ×8 inches. The cellular transceiver unit 70 is realized with a Model CPTE-1R cellular unit, available from Telular, Inc., of Wilmette, Ill., having its operating program (firmware) modified as described above in Table 1, or in an equivalent manner, so that it can only access a single telephone number.

Figure 3:
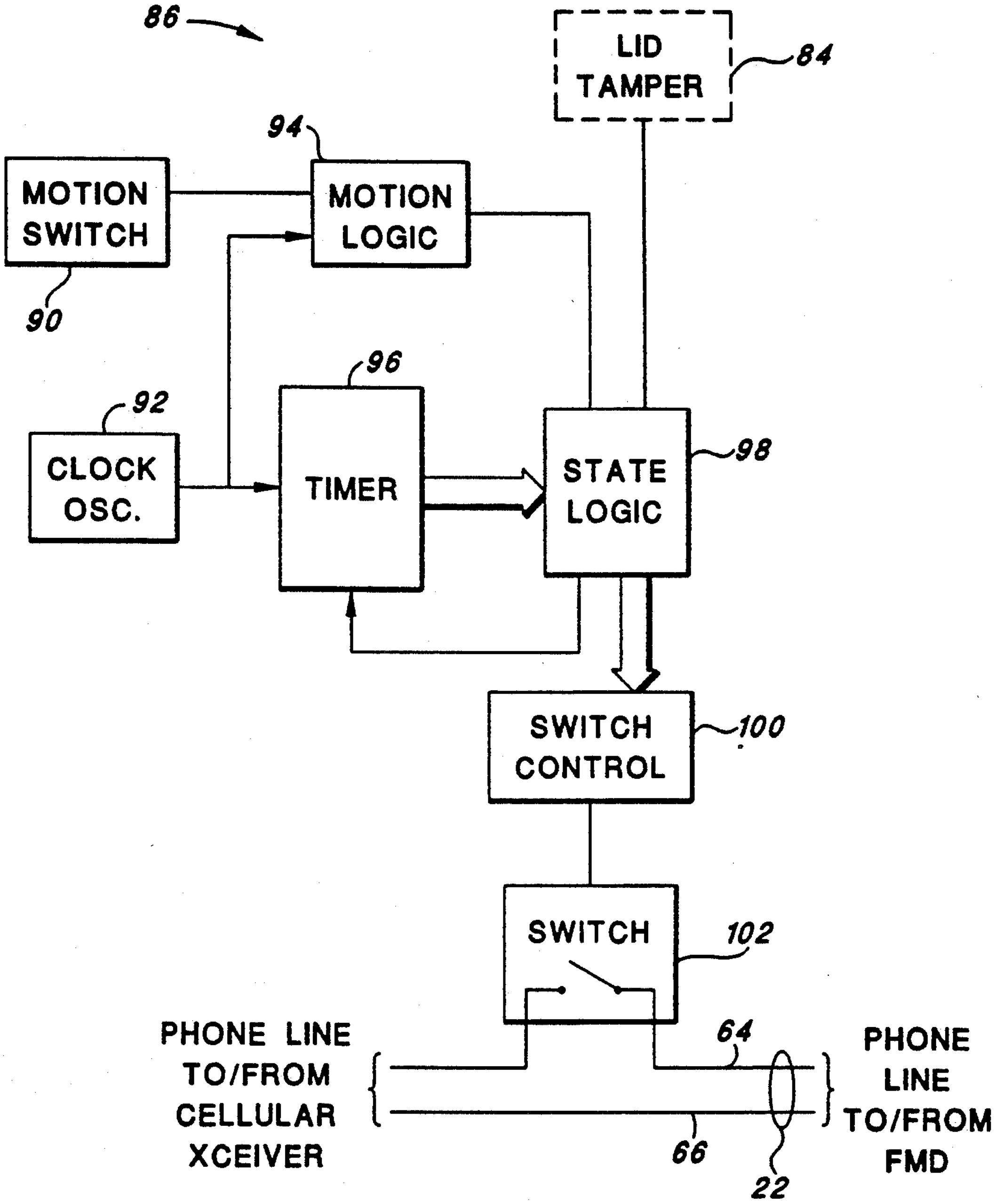
FIG. 3 is an electrical block diagram of the custom CIU circuits included on the CIU PCB 86 shown in FIG. 2.

Referring next to FIG. 3, there is shown an electrical block diagram of the circuits included on the CIU PCB 86. Also included in FIG. 3, although not physically located on the PCB 86, is the lid tamper detect circuit 84. These circuits cooperate to detect a CIU tamper event, i.e., sustained motion of the CIU 30, or an attempt to open the closed housing of the CIU 30. To this end, a motion switch 90 is coupled to a motion logic circuit 94. Also coupled to the motion logic circuit 94 is a clock signal, generated by a clock oscillator circuit 92. The motion switch 90 makes and breaks electrical contact between two electrical conductors any time the CIU is moved. Thus, through appropriate biasing, the output of the motion switch appears as a high or low voltage, with the frequency of the signal transitions occurring asynchronously relative to the clock signal. This motion signal is synchronized with the clock signal in the motion logic circuit 94.

The clock signal is also applied to a timer circuit 96. The timer circuit generates appropriate time intervals, or time windows, that are used within a state logic circuit 98. The state logic circuit 98 includes as input signals the output of the motion logic circuit 94 and the timing signals, or "time windows", generated by the timer circuit 96. It is the function of the state logic circuit 98 to define a plurality of operating states for the CIU 30. That is, as controlled by the CIU PCB 86, the CIU 30 is a "state machine", operating in one of a plurality of possible states as a function of whether any potential tamper events have been detected by the lid tamper circuit 84 or the motion switch 90. These operating states are explained more fully below in conjunction with the state diagram of FIG. 4.

Still referring to FIG. 3, the state logic circuit 98 drives a switch control circuit 100. Depending upon the particular state assumed by the state logic 98, the switch control circuit 100 closes or opens a switch 102. This switch 102 is in series with one of the tip or ring conductors 64 or 66 of the phone line cable 22 from the FMD 20. In the absence of a potential tamper event, the switch 102 remains closed, thus connecting the FMD phone line 22 to the CIU 30, thereby allowing telecommunicative contact between the FMD and the host computer via the cellular network. In the presence of a potential tamper event, the state logic performs some processing steps, explained below in connection with the description of the state diagram of FIG. 4, that discriminate between sustained motion and incidental motion. Sustained motion is considered to be a tamper event, while incidental motion is not. Further, any lid tamper event is considered to be a tamper event. A tamper event causes a tamper state to be assumed by the state logic 98. Such a tamper state forces the switch 102 open for a temporary time period. The FMD 30, which monitors the voltage between the tip and ring conductors 64 and 66, detects this momentary opening of the phone line 22 as a tamper event. As soon as the phone line is closed, i.e., after the temporary time period, the FMD establishes telecommunicative contact with the host computer and reports the detected tamper event.

Figure 4:
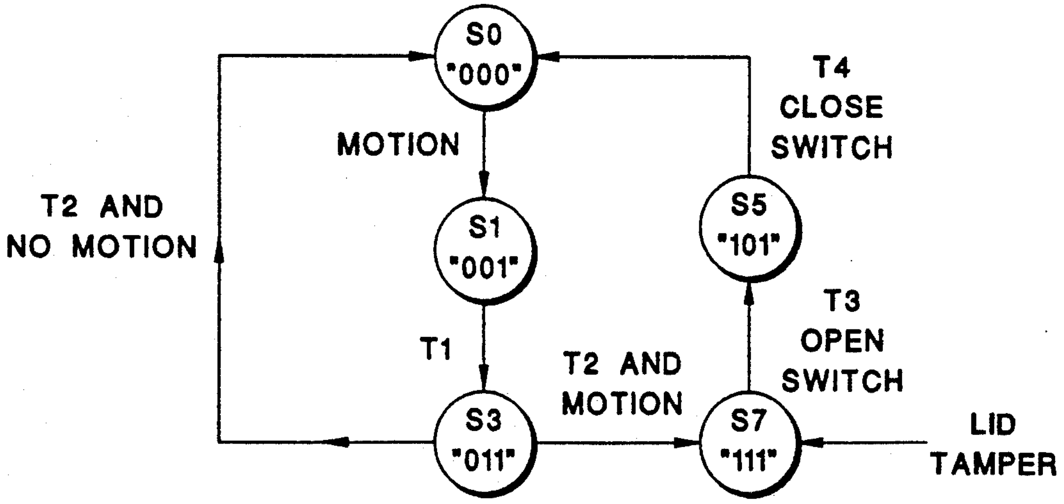
FIG. 4 is a state diagram showing the various states assumed by the state logic circuits of the CIU state logic shown in FIG. 3.

Referring to FIG. 4, a state diagram showing the various states assumed by the state logic circuit 98 is shown. A normal operating state S0 ("000") is assumed in the absence of any potential tamper events. If motion is detected, a first state S1 ("001") is immediately entered. State S1 lasts for a first time period T1. In the preferred embodiment, T1 is 30 seconds. At the conclusion of the time period T1, a second state S3 ("011") is entered. During state S3, a second time period T2, or "time window" having a duration of T2 seconds, is opened. If during the time period T2 no further motion is sensed, then the state logic causes state S0 ("000", where the numbers within quotes are the binary representation of the particular state) to be reentered. If, however, during the time period T2 further motion is sensed, then a new state S7 ("111") is entered. In the preferred embodiment, the time period T2 is also 30 seconds.

State S7 is the "tamper state", and may also be entered at any time by the sensing of a lid tamper event. Entering state S7 causes a third time period T3 to begin. In the preferred embodiment, T3 is approximately two minutes (120 seconds). While in state S7, the switch 102 (FIG. 3) is opened. At the conclusion of the time period T3, a new state S5 ("101") is entered. During state S5, the switch 102 is again closed, thereby enabling telecommunicative contact to be established between the FMD and the host computer so that the tamper event can be reported. State S5 lasts for a fourth time period T4. In the preferred embodiment, T4 is approximately six minutes (360 seconds). At the timing out of T4, state S0 is reentered. The state logic remains in state S0 until such time as the next motion signal or lid tamper signal is detected.

Figure 5A:
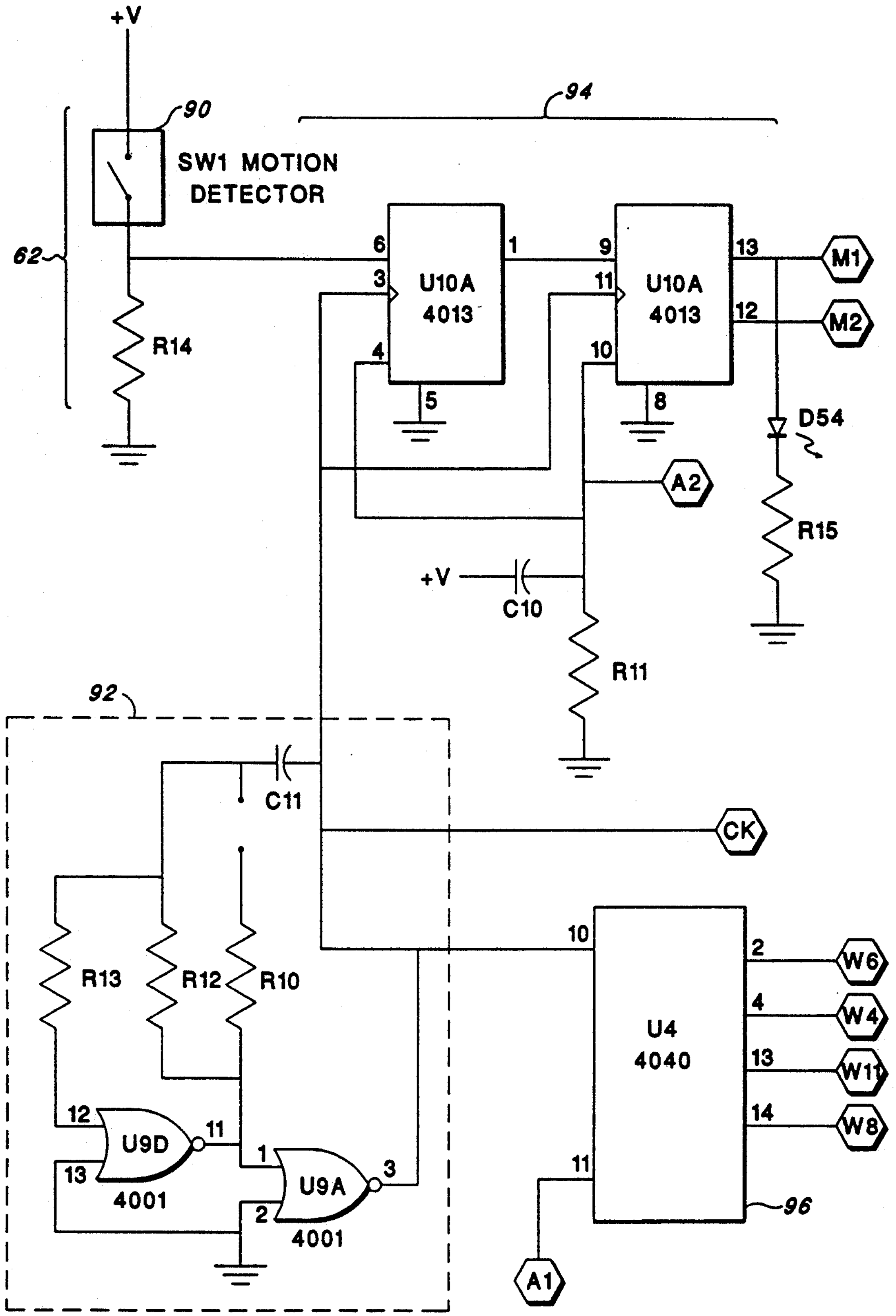
FIGS. 5A, 5B and 5C are electrical logic/schematic diagrams of the CIU in accordance with a preferred embodiment of the invention.
Figure 5B:
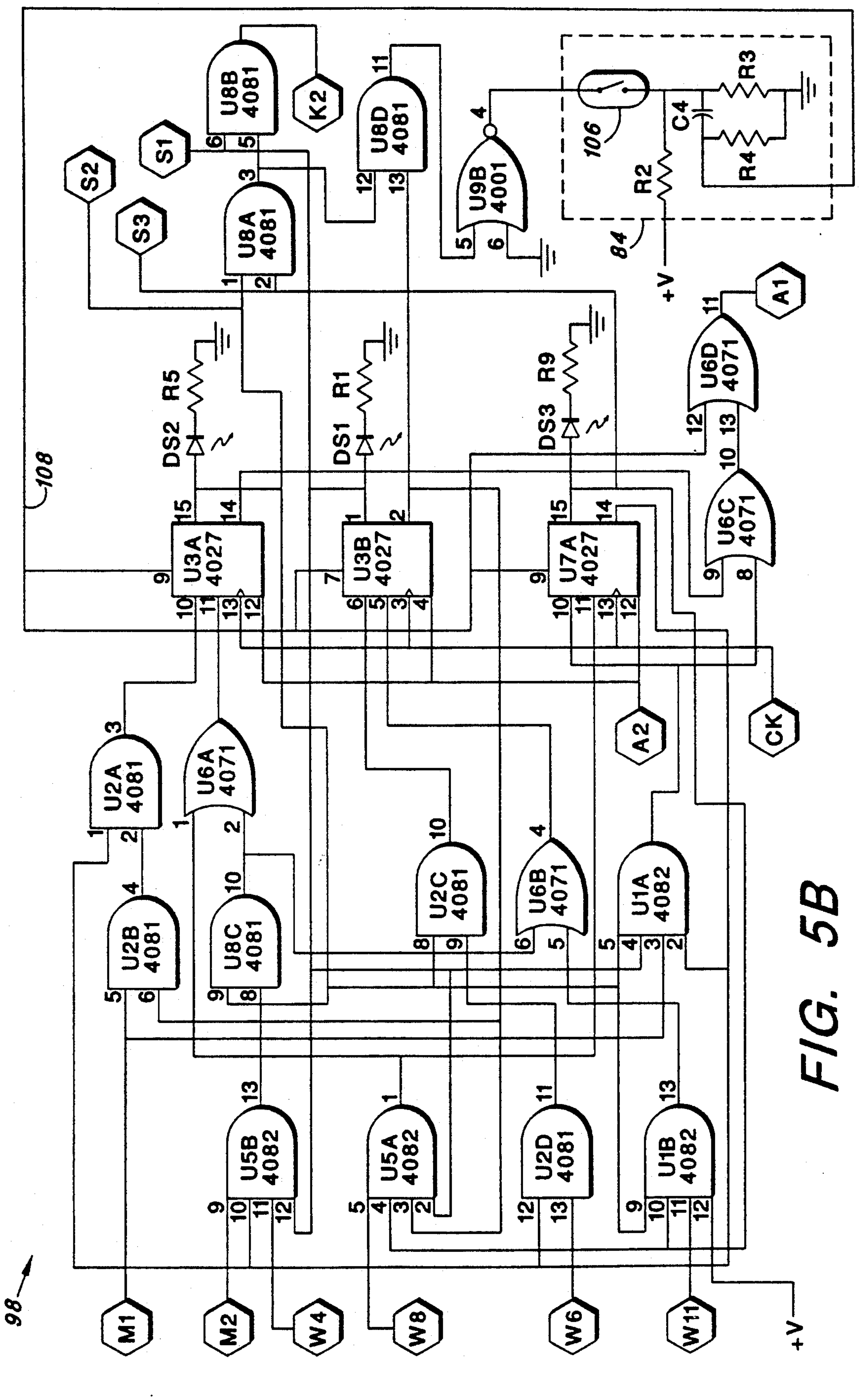
Figure 5C:
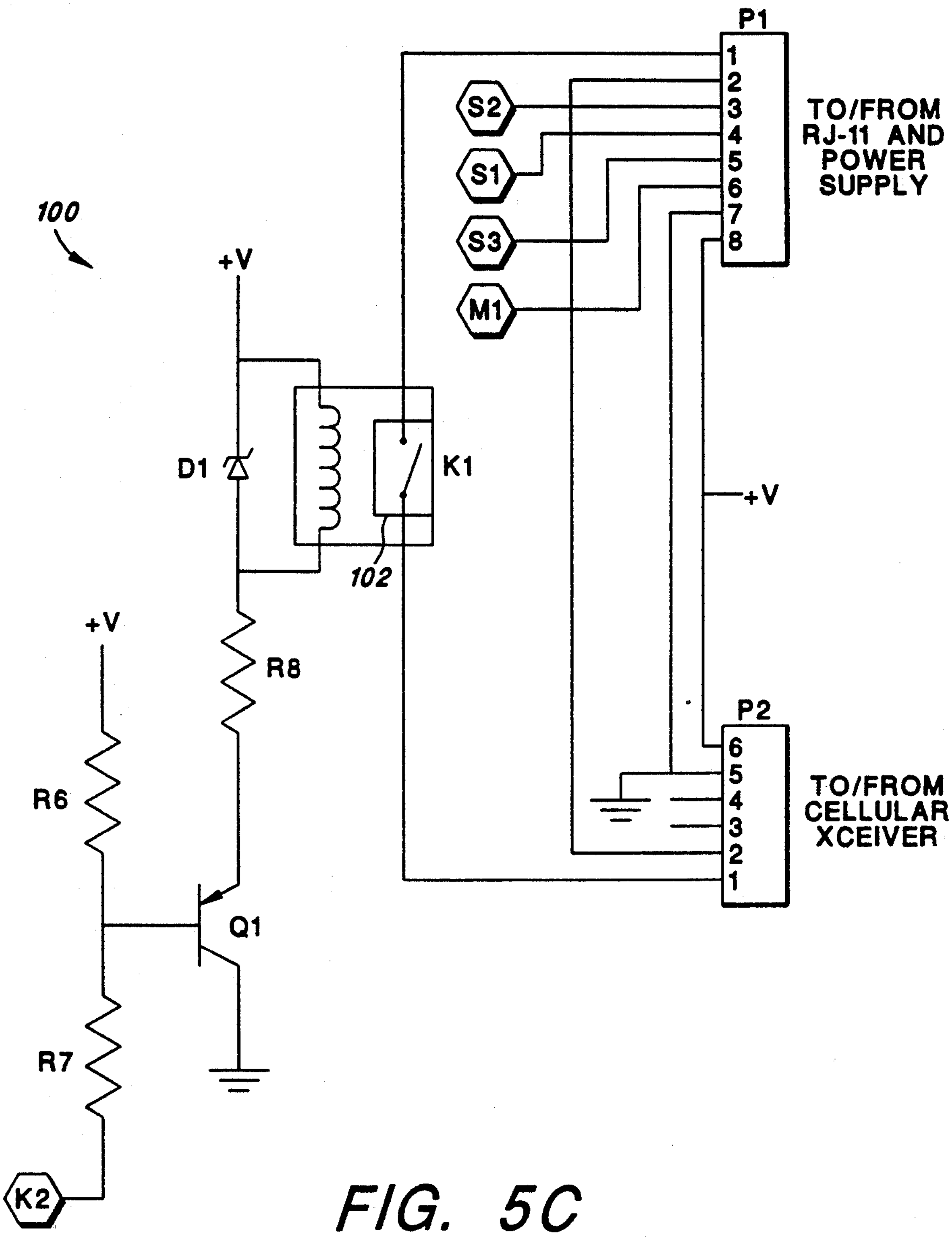

FIGS. 5A, 5B and 5C are electrical logic/schematic diagrams of a preferred embodiment of the CIU PCB 98. For the most part, these logic/schematic diagrams are believed to be self-explanatory to those of skill in the art, particularly when viewed in light of the description of the block diagram of the same circuitry described above in connection with FIG. 3. It is noted that like reference characters are used to describe like parts of FIGS. 3 and 5A–5C. Further, FIGS. 5A–5C include generic part numbers for each of the logic circuits, realized from the 4000 series of CMOS logic available from numerous integrated circuit (IC) vendors, as well as pin numbers for making connections with each IC. Thus, one of skill in the art could readily fabricate the PCB 86 using the detail provided in FIGS. 5A-5C. It is also noted that FIGS. 5A-5C are intended to be viewed as one schematic/logic diagram, with connections between the diagrams being made between like hexagonal connectors.

Thus, for example, as seen in FIG. 5A, the motion switch 90 is realized from a switch SW1 and a bias resistor R14. One side of the switch SW1 is coupled to the positive supply voltage +V. The other side of the switch SW1 is coupled through resistor R14 to ground. The R14 side of the switch SW1 provides the signal output, and will thus be a signal that is +V or ground depending upon whether the switch SW1 is closed or open. SW1 may be a conventional mercury motion switch, available from numerous sources. This switch may be mounted directly on the PCB 86, or elsewhere within the closed housing 62.

The clock oscillator 92 is made from two dual input NAND gates, U9A and U9D (both of which are in a single quad 4001 NAND gate IC) configured as series inverter gates (i.e., one input of each gate is grounded, and the output of gate U9D is connected to the input of gate U9A). Positive feedback is established by coupling the output of gate U9A (pin 3) to the input of gate U9D (pin 12) through capacitor C11 and resistor R13. A resistor R12 also connects the C11-R13 node to the input of gate U9A. Another resistor R10 may be optionally connected in parallel with resistor R12 in order to adjust the frequency of the oscillator. In the preferred embodiment, the frequency of the oscillator circuit 92 is set to approximately 1 Hz.

The output clock signal from the clock oscillator 92 drives two flip flops U10A and U10B (4013). These two flip flops function as the motion logic circuit 94. One input (pin 6) of flip flop U10A is connected to the output of the motion detector 90. An output (pin 1) of U10A is connected to an input (pin 9) of U10B. The output of the motion logic 94 comprises the output state of flip flop U10B, available on pins 12 and 13, and labeled M1 and M2. (M1 is the complement of M2.) Whenever motion is detected, as determined by the motion switch SW1, flip flop U10B is set to one state for at least one clock cycle, thereby producing a pulse having a duration of at least 1 second (assuming a clock frequency of about 1 Hz). This pulse causes light emitting diode (LED) DS4 to light for the duration of the motion detect signal.

A power-on reset circuit comprising resistor R11 and capacitor C10 provides a reset signal on signal line A2 when power is first turned on. This power-on reset signal is applied to pin 4 of U10A and pin 10 of U10B, as well as other locations throughout the CIU circuit. One side of capacitor C10 is connected to +V. One side of resistor R11 is grounded. The C10-R11 node is connected to signal line A2, which signal line provides the power-on reset signal to the desired locations throughout the circuit. When power is first applied to the circuit, this reset signal is +V. However, this signal decays to ground potential in accordance with a prescribed time constant, set primarily by the values of C10 and R11. This power-on reset signal is used to force the flip flops U10A and U10B, as well as other flip flops used on the CIU PCB 86, to a desired initial state as power is first applied to the CIU.

Still referring to FIG. 5A, the timer circuit 96 is preferably realized from a single IC, U4. In the preferred embodiment, U4 is a 4040 IC, a 12-Bit, Ripple Carry, Binary Counter/Divider. Hence, the various outputs of the timer U4, four of which are shown in FIG. 5A, provide timing signals of varying length, which are utilized by the state logic 98.

The state logic 98 is shown in FIG. 5B. At the heart of the state logic 98 are three state flip flops, U3A, U3B, and U7A. The state of these flip flops determines the operating state of the state logic at any particular time. The operating states are designed to sequence as shown in the state logic diagram described above in connection with FIG. 4. Thus, in state S0 ("000"), all three state flip flops are reset. In contrast, in state S7 ("111"), all three state flip flops are set. In other states, such as state S1 ("001"), S3 ("011"), or S5 ("101"), at least one of the flip flops is reset, and the remaining flip flop(s) are set. The state of each flip flop is determined by the particular logic signals applied to the respective inputs of each at the time of an active clock transition of the clock signal. These logic signals, in turn, are determined by logic signals derived from the state logic gates. These state logic gates include: AND gates, such as U1A, U1B, U5A, and U5B (4082) and U2A, U2B, U2C, U2D, U8A, U8B and U8D (4081); NOR gates, such as U6A, U6B, U6C, U6D (4071); and NOR gate U9B (4001), interconnected as shown in FIG. 5B.

Basically, the logic configuration shown in FIG. 5B is designed to cause the state flip flops to be set and reset as a function of the status of the motion logic 94 (FIG. 5A), the present state of the state flip flops, the timing signals derived from the timer circuit 96 (FIG. 5A), and the lid tamper circuit 84. For example, at power up (i.e., when power is first applied to the CIU), the power-on reset signal on signal line A2 causes all three state flip flops to be reset. Hence, state S0 ("000") is initially assumed. State S0 remains as the operating state until either a motion signal M1 is generated, or until a lid tamper is detected. For example, the occurrence of a motion signal M1 is coupled through AND gates U2B and U2A, assuming both flip flops U3B and U7A are reset (which they will be if in state S0), to the input of flip flop U3A. Thus, at the next active transition of the clock signal, CK, flip flop U3A is set to a "1", thereby changing the state of the CIU circuit from state S0 to state S1. After being in state S1 for a prescribed time period, flip flop U3B is set, thereby changing the state from state S1 to state S3. The states are changed thereafter in accordance with the state diagram of FIG. 4.

Similarly, the occurrence of a lid tamper signal, obtained from the lid tamper circuit 84, causes all three state flip flops to be set, thereby immediately forcing the state of the state logic to state S7. The lid tamper circuit 84, as shown in FIG. 5B, includes a magnetic reed switch 106 and separate magnet (not shown in FIG. 5B) of the type commonly used in security systems. The reed switch and magnet are placed on the inside of the CIU housing 62. A piece of sheet steel is attached to the case lid, such that when the lid is closed the steel blade is located between the magnet and the reed switch, shunting the magnetic field into the steel and away from the magnetic reed switch. When the lid is opened, the steel blade is removed from between the magnet and reed switch, causing a change in state of the reed switch 106. As seen in FIG. 5B, one side of the reed switch 106 is connected through a bias resistor R2 to +V and a bias resistor R3 to ground. This same side of the reed switch 106 is coupled through a coupling capacitor C4 to signal line 108, which signal line is connected to the set terminal of each of the three state flip flops. The signal line 108 is connected to ground through bias resistor R4. Hence, the set terminal of the three state flip flops is normally low. The other side of the reed switch 106 is connected to the output of NOR gate U9B. The output of NOR gate U9B will always be high except when the state of the CIU state logic is state S7. Hence, a closure of the reed switch 106, as occurs when the lid of the CIU case is opened, causes a high voltage to momentarily appear on set line 108. This high voltage sets each of the state flip flops to the "1" state, thereby forcing the operating state to state S7.

LED's DS1, DS2, and DS3, are connected to the state flip flops U3B, U3A, and U7A, respectively, through bias resistors R1, R5 and R9, respectively. These LED's provide a visual indication of the current operating state of the CIU circuit, with DS3 representing the most significant bit of the binary equivalent of the operating state, DS1 representing the next most significant bit, and DS2 representing the least significant bit. Thus, in state S0, all three LED's are off. In state S1, DS2 is on, and DS1 and DS3 are off; in state S3, DS2 and DS1 are on, and DS3 is off; and so on, with all three LED's being on in state S7. The use of such LED's is optional, as their inclusion does not alter the performance of the circuit in any way.

As seen in FIG. 5B, the output of AND gate U8B assumes a high state only when all three state flip flops are set, i.e., only when the state logic is in state S7. In state S7, a signal K2 turns on a transistor switch Q1, shown in FIG. 5C, which transistor switch functions as the switch control circuit 100 (FIG. 3). When turned on, transistor switch Q1 energizes the coil of relay K1, thereby causing the switch contacts of the relay, which switch contacts function as the switch 102 (FIG. 3), to close. As described previously, switch 102 is connected in series with one of the tip or ring conductors of the telephone line 22 received from the FMD 20 and sent to the CIU 30. A suitable connector jack P1 connects the tip or ring conductor through the switch 102 to another connector jack P2. The connector jack P1 may optionally include pin connections for monitoring the state of the CIU state logic, signal lines S1, S2 and S3, as well as the state of the motion logic, M1. These pin connections for providing the state signals S1, S2, S3 and the motion signal M1, are used primarily for testing the CIU 30 during installation or debug. In use, the cellular transceiver 70 is simply plugged into connector P2, and the phone line cord 22 from the FMD 20 is plugged into the connector P1.

A further embodiment of the present invention provides a method for automatically monitoring the presence of a person at a house arrest location remote from a central location. Such method includes the steps of:

(a) identifying the presence of the person being monitored at the house arrest location;

(b) generating a data signal indicating the presence of the person at the house arrest location;

(c) configuring a host computer at the central location to process the data signals generated at the house arrest location(s) so as to report when the person is present at the house arrest location; and (d) establishing a secure telecommunicative link between the house arrest location and the central location through which the data signal(s) may be sent to the host computer, this secure telecommunicative link being established using a cellular interface unit at the house arrest location that can only access the host computer through a cellular telephone network, and the cellular interface unit including the ability to sense and report any attempts to tamper therewith.

This method may be carried out using any suitable EHAM system, e.g., the one described above in connection with FIG. 1, coupled to a suitable cellular interface unit, e.g., the one described above in connection with FIGS. 2-5.

From the above description, it is seen that the present invention provides an electronic house arrest monitoring (EHAM) system that advantageously performs the house arrest monitoring function regardless of whether there is a telephone installed at the house arrest location. Such monitoring is made possible through the use of a special EHAM cellular interface unit (CIU) that couples a field monitoring device (FMD) used at the remote house arrest monitoring location to a host computer at a central location through a cellular telephone network.

As further seen from the above description, the present invention provides a cellular interface unit (CIU) that may be optionally used with an EHAM system in order to couple the EHAM system to a central monitoring location where a host computer is located through a cellular telephone network. The use of such CIU is particularly advantageous when the house arrest location does not have a telephone line installed.

As also seen from the above description of the present invention, the CIU is configured to detect and report any attempt to tamper with or move the CIU. Advantageously, the CIU circuits are further configured to distinguish and not report nuisance movements of the CIU, e.g., accidental bumping of the CIU. Moreover, the CIU is configured to contact only a single telephone number through a cellular telephone network, thereby restricting the use of the CIU to the intended use of interfacing with a host computer at a central EHAM location.

Further, as described above, it is seen that the CIU of the present invention may advantageously be used with any FMD of an EHAM system adapted to interface with a conventional telephone line. Thus, the FMD used with a CIU made in accordance with the present invention need not be any different from a conventional FMD that connects with an installed telephone line, and in fact the FMD circuits are oblivious to whether the FMD is connected to a standard telephone line or to the CIU of the present invention. As a result, the manufacturing and installation specifications associated with the FMD are greatly simplified, and a significant savings is realized in both manufacturing and installation costs of the EHAM system, regardless of whether such EHAM system is used with the CIU of the present invention.

While the invention herein disclosed has been described by means of specific embodiments and applications thereof, numerous modifications and variations could be made thereto by those skilled in the art without departing from the scope of the invention set forth in the claims.

What is claimed is:

1. A cellular-based electronic house arrest monitoring (EHAM) system comprising:

(1) identifying means for generating a unique identifying (ID) signal that identifies a person being monitored.

(2) a field monitoring device (FMD) placed at a house arrest location where the person being monitored is supposed to be, said FMD including (a) receiver means for receiving the ID signal only if the person being monitored is at the house arrest location, (b) means for establishing telecommunicative contact with a host computer at a monitoring location remote from the house arrest location, (c) means for generating data signals that are sent to said host computer via said telecommunicative contact to report information concerning when said ID signal is received and status information associated with the operation and identity of said identifying means and said FMD, and (d) tamper means for sensing any interruption in said established telecommunicative contact and reporting such interruption to said host computer via said data signals once said telecommunicative contact is again established;

(3) a cellular interface unit comprising:

(a) cellular transceiver means for transmitting and receiving cellular telephone signals to and from a prescribed telephone number through a cellular telephone network;

(b) connector means for detachably establishing telecommunicative contact with said FMD through which the data signals generated by said FMD is coupled to said cellular transceiver means, whereby said data signal will sent to said host computer through said cellular telephone network;

(c) tamper sensing means for sensing any attempt to tamper with said cellular interface unit and for momentarily interrupting telecommunicative contact in response thereto, whereby any attempt to tamper with said cellular interface unit causes said established telecommunicative contact to be momentarily interrupted, which interruption is reported to said host computer via said data signals once said telecommunicative contact is against established; and (4) a closed housing wherein at least said cellular interface unit is housed, said housing having power supply means located therein for providing operating power for said cellular interface unit, and wherein said tamper sensing means of said cellular interface unit includes movement means for sensing any non-incidental motion of said closed housing, said movement means including:

a motion detector for generating a motion signal upon detecting motion of said closed housing; and discrimination means for discriminating incidental generation of said motion signal from non-incidental generation of said motion signal, said non-incidental generation of said motion signal comprising the occurrence of an initial motion signal followed by the occurrence of a subsequent motion signal at least a first time period after the initial motion signal, but not longer than a second time period after the initial motion signal.

2. A cellular-based electronic house arrest monitoring (EHAM) system comprising:

(1) identifying means for generating a unique identifying (ID) signal that identifies a person being monitored;

(2) a field monitoring device (FMD) placed at a house arrest location where the person being monitored is supposed to be, said FMD including (a) receiver means for receiving the ID signal only if the person being monitored is at the house arrest location, (b) means for establishing telecommunicative contact with a host computer at a monitoring location remote from the house arrest location;

(c) means for generating data signals that are sent to said host computer via said telecommunicative contact to report information concerning when said ID signal is received and status information associated with the operation and identity of said identifying means and said FMD, and (d) tamper means for sensing any interruption in said established telecommunicative contact and reporting such interruption to said host computer via said data signals once said telecommunicative contact is against established;

(3) a cellular interface unit comprising:

(a) cellular transceiver means for transmitting and receiving cellular telephone signals to and from a prescribed telephone number through a cellular telephone network, said cellular transceiver means including memory means for storing a single telephone number, said single telephone number being the only telephone number that can be accessed through said cellular telephone network by way of said cellular interface unit;

(b) connector means for detachably establishing telecommunicative contact with said FMD through which the data signals generated by said FMD is coupled to said cellular transceiver means, whereby said data signals will sent to said host computer through said cellular telephone network;

(c) tamper sensing means for sensing any attempt to tamper with said cellular interface unit and for momentarily interrupting said telecommunicative contact in response thereto, whereby any attempt to tamper with said cellular interface unit causes said established telecommunicative contact to be momentarily interrupted, which interruption is reported to said host computer via said data signals once said telecommunicative contact is again established; and (4) a closed housing wherein at least said cellular interface unit is housed, said housing having power supply means located therein for providing operating power for said cellular interface unit, and wherein said tamper sensing means of said cellular interface unit includes movement means for sensing any non-incidental motion of said closed housing.

3. A cellular interface unit for use with an electronic house arrest monitoring (EHAM) system, said EHAM system including: (1) identifying means for positively identifying an individual; and (2) interface means placed at a house arrest location where a person being monitored is supposed to be for interfacing the identifying means with a host computer via an established telecommunicative link; said cellular interface unit comprising:

cellular transceiver means for transmitting and receiving cellular telephone signals to and from a prescribed telephone number through a cellular telephone network, a host computer being coupled to said prescribed telephone number;

connector means for detachably connecting a telecommunicative cable from said interface means to said cellular transceiver means, whereby telecommunicative contact may be established between said interface means and said host computer through which data signals may be sent;

sensing means for sensing any attempt to tamper with said cellular interface unit and for momentarily interrupting said coupling means in response thereto;

a closed container wherein said cellular transceiver means, coupling means, and sensing means are housed; and power supply means within said closed container for providing operating power for said cellular interface unit;

whereby any attempt to tamper with said cellular interface unit causes said telecommunicative contact to be momentarily interrupted, which interruption is reported to said host computer via said data signals once said telecommunicative contact is again established; and wherein said sensing means includes movement means for sensing any non-incidental motion of said closed container, said movement means including:

a motion detector for generating a motion signal upon detection motion of said container; and discrimination means for discriminating incidental generation of said motion signal from non-incidental generation of said motion signal.

4. The cellular interface unit as set forth in claim 3 wherein said discrimination means includes timing means for sensing the frequency of occurrence of the motion signal generated by said motion detector; and state logic means responsive to said timing means and said sensed motion signal for defining an operating state of said cellular interface unit.

5. The cellular interface unit as set forth in claim 4 wherein said state logic means defines a plurality of operating states, a first operating state comprising an idle state wherein said cellular interface unit performs the function of interfacing data signals between the FMD and a cellular telephone network; a second operating state, entered from said first operating state in response to the occurrence of a motion signal, comprising an operating state that lasts for a first time interval; a third operating state, entered at the conclusion of said first time interval, comprising an operating state that initiates a second time interval during which said state logic means monitors said motion detector for the recurrence of a motion signal; said first operating state being reentered upon the absence of a motion signal during said second time interval; a fourth operating state, entered upon the occurrence of a motion signal during said second time interval, comprising an operating state that defines a third time interval during which said coupling means interrupts said telecommunicative contact; said first operating state being reentered subsequent to the conclusion of said third time interval; whereby an initial motion signal followed by a subsequent motion signal that occurs at least said first time interval thereafter, but not longer than said second time interval thereafter, comprises non-incidental generation of said motion signal.

6. The cellular interface unit as set forth in claim 5 wherein said state logic means further defines a fifth operating state that is entered from said fourth operating state at the conclusion of said third time interval, said fifth operating state defining a fourth time interval; said first operating state being reentered at the conclusion of said fourth time interval.

7. The cellular interface unit as set forth in claim 6 wherein said first and second time intervals each comprise about 30 seconds, said third time interval comprises about two minutes, and said fourth time interval comprises about six minutes.

8. The cellular interface unit as set forth in claim 6 wherein said sensing means also includes means for sensing any attempt to open said closed container, and wherein any sensed attempt to open said closed container causes said state logic means to immediately enter said fourth operating state.

* * * * *